US010823978B2

(12) United States Patent
Zhang

(10) Patent No.: US 10,823,978 B2
(45) Date of Patent: Nov. 3, 2020

(54) OPTICAL IMAGING FILM AND PREPARATION METHOD THEREFOR

(71) Applicant: Shine Optoelectronics (Kunshan) Co., Ltd., Kunshan (CN)

(72) Inventor: Jian Zhang, Kunshan (CN)

(73) Assignee: Shine Optoelectronics (Kunshan) Co., Ltd., Kunshan (CN)

( * ) Notice: Subject to any disclaimer, the term of this patent is extended or adjusted under 35 U.S.C. 154(b) by 160 days.

(21) Appl. No.: 16/138,853

(22) Filed: Sep. 21, 2018

(65) Prior Publication Data
US 2019/0033608 A1 Jan. 31, 2019

Related U.S. Application Data

(63) Continuation of application No. PCT/CN2017/075098, filed on Feb. 28, 2017.

(30) Foreign Application Priority Data

Mar. 22, 2016 (CN) .......................... 2016 1 0167931

(51) Int. Cl.
G02B 30/27 (2020.01)
B29D 11/00 (2006.01)
(Continued)

(52) U.S. Cl.
CPC .............. G02B 30/27 (2020.01); B29D 11/00 (2013.01); B29D 11/00298 (2013.01);
(Continued)

(58) Field of Classification Search
CPC .............. B29D 11/00; B29D 11/00298; B29D 11/00788; G02B 30/27; G02B 30/52; G02B 3/0037
See application file for complete search history.

(56) References Cited

U.S. PATENT DOCUMENTS 3,264,164 A * 8/1966 Jerothe .................. G03B 35/24
428/29
2007/0058260 A1* 3/2007 Steenblik ............... B42D 25/29
359/626
(Continued)

FOREIGN PATENT DOCUMENTS

AU       2015207918 A1    8/2015
CN       101850680 A     10/2010
(Continued)

OTHER PUBLICATIONS

Machine translation of CN 104035148 A, downloaded from Espacenet, May 13, 2020 (Year: 2020).*
(Continued)

Primary Examiner — Cara E Rakowski
(74) Attorney, Agent, or Firm — Hamilton, Brook, Smith & Reynolds, P.C.

(57) ABSTRACT

The present application relates to the technical field of optical film, and discloses an optical imaging film and a preparation method thereof. The optical imaging film comprises: a body having a first surface and a second surface which are opposite to each other; a focusing structure formed on the first surface of the body; and N layers of graphic and text structure which are stacked in sequence on the second surface of the body or inside the body, wherein, each layer of graphic and text structure is located within an imaging range of the focusing structure, and each layer of graphic and text structure in the imaging range can form a suspension image by means of the focusing structure. Through the technical solutions disclosed in the embodiments of the present application, the anti-counterfeiting effect of an imaging film can be improved, and the imaging of the imaging film can present better sense of layering and has more diversified colors.

16 Claims, 5 Drawing Sheets

(51) Int. Cl.
*G02B 3/00* (2006.01)
*G02B 30/52* (2020.01)

(52) U.S. Cl.
CPC ...... *G02B 3/0037* (2013.01); *B29D 11/00788* (2013.01); *G02B 30/52* (2020.01)

(56) References Cited

U.S. PATENT DOCUMENTS

2011/0122499 A1    5/2011    Commander et al.
2014/0376088 A1*  12/2014    Kim ................. B42D 25/29
                                                      359/463

FOREIGN PATENT DOCUMENTS

| CN | 103236222 A | 8/2013 |
|---|---|---|
| CN | 103309047 A | 9/2013 |
| CN | 104035148 A | 9/2014 |
| CN | 205643883 U | 10/2016 |
| CN | 205693709 U | 11/2016 |
| JP | 2003279893 A | 10/2003 |

OTHER PUBLICATIONS

International Search Report Issued in International Application No. PCT/CN2017/075098, Entitled "Optical Imaging Film and Preparation Method Therefor", Search Report dated Apr. 27, 2017.

Written Opinion of the International Search Authority Issued in International Application No. CT/CN2017/075098, Entitled "Optical Imaging Film and Preparation Method Therefor", Search Report dated Apr. 27, 2017.

* cited by examiner

OPTICAL IMAGING FILM AND PREPARATION METHOD THEREFOR

CROSS-REFERENCE TO RELATED APPLICATIONS

The present application is a Continuation of International Application No. PCT/CN2017/075098, which designates the United States and was filed on Feb. 28, 2017, published in Chinese, which claims priority to Chinese Application No. 201610167931X, filed on Mar. 22, 2016. The entire teachings of the above applications are incorporated herein by reference.

TECHNICAL FIELD

The present invention relates to the technical field of optical film, and in particular relates to an optical imaging film and a preparation method thereof.

BACKGROUND

Micro lens array imaging technology utilizes the special imaging effect of a micro lens array to realize the enlargement of micro graphs and text.

At present, the optical imaging film fabricated by the micro lens array imaging technology generally comprises a transparent base layer, a periodic micro lens array provided on an upper surface of the transparent base layer, and a corresponding periodic micro pattern array provided on a lower surface of the transparent base layer. The micro pattern array is located on or adjacent to a focal plane of the micro lens array, the arrangements of the micro pattern array and the micro lens array are substantially the same, and a Moire enlargement effect of the micro pattern array is realized by means of the micro lens array.

During the implementation of the present application, the inventor had found that the prior art at least has the following problem:

the graphic and text structure of the above optical imaging film is simple, thus the imaging of the imaging film lacks the sense of layering.

SUMMARY

The goal of the embodiments of the present application is to provide an optical imaging film and a preparation method thereof in order to improve the sense of layering of the imaging of the imaging film.

In order to solve the above technical problem, the optical imaging film provided by the embodiments of the present application is implemented in the following way.

The embodiments of the present application provide an optical imaging film, comprising:

a body having a first surface and a second surface which are opposite to each other;

a focusing structure provided on the first surface of the body;

N layers of graphic and text structure which are stacked in sequence on the second surface of the body or inside the body, N being a positive integer greater than 1, wherein, each layer of graphic and text structure is located within an imaging range of the focusing structure, and each layer of graphic and text structure in the imaging range can form a suspension image by means of the focusing structure.

In at least one embodiment, the body, the focusing structure and the N layers of graphic and text structure are an integral structure.

In at least one embodiment, a polymer used to fabricate the focusing structure and the N layers of graphic and text structure and a polymer used to fabricate the body are a same polymer; or, a fused portion is formed between a polymer used to fabricate the focusing structure and another polymer used to fabricate a first layer of graphic and text structure in the N layers of graphic and text structure, and a polymer used to fabricate the rest N layers of graphic and text structure is the same as the polymer used to fabricate the first layer of graphic and text structure.

In at least one embodiment, a difference value of refractive index between a fabricating material of the focusing structure and a fabricating material of each layer of graphic and text structure is less than 0.5.

In at least one embodiment, a distance from each layer of graphic and text structure to a focal plane of the focusing structure is from 0.7 to 1.3 times of a focal length of the focusing structure.

In at least one embodiment, a height of the suspension image formed by each layer of graphic and text structure and a distance from each layer of graphic and text structure to the focusing structure satisfy the following relational expression:

$$d_i = \frac{f_i - R}{1 - \frac{x_i}{x_{MLA}}} + R,$$

wherein, $d_i$ is the height of the suspension image; $f_i$ is the distance from the $i^{th}$ layer of graphic and text structure to the focusing structure; R is a radius of curvature of the focusing structure; $x_i$ is a horizontal coordinate of the $i^{th}$ layer of graphic and text structure; $x_{MLA}$ is a horizontal coordinate of the focusing structure, and a value of i is ranged from 1 to N.

In at least one embodiment, each layer of graphic and text structure contains a plurality of graphic and text units, and the projections of the graphic and text units in different layers of graphic and text structure on a horizontal plane do not overlap one another.

In at least one embodiment, a horizontal position of each graphic and text unit in each layer of graphic and text structure corresponds to a spacing between two corresponding graphic and text units in adjacent layers of graphic and text structure.

In at least one embodiment, each layer of graphic and text structure contains a plurality of graphic and text units, the graphic and text units in a same layer of graphic and text structure have the same color, and the graphic and text units in different layers of graphic and text structure have different colors.

In at least one embodiment, when N is equal to 2, a recess or protrusion is provided on the second surface of the body to form a first layer of graphic and text structure, and a recess or protrusion is formed on a side of the first layer of graphic and text structure away from the focusing structure to form a second layer of graphic and text structure;

when N is greater than 2, a recess or protrusion is provided on the second surface of the body to form a first layer of graphic and text structure, a recess or protrusion is formed on a side of the first layer of graphic and text structure away from the focusing structure to form a second layer of graphic and text structure, and a recess or protrusion is formed on a side of a $(j+1)^{th}$ layer of graphic and text structure away from a $j^{th}$ layer of graphic and text structure to form a $(j+2)^{th}$ layer of graphic and text structure, wherein j is a positive integer between 1 and N−2.

In at least one embodiment, the focusing structure comprises a convex lens, a concave lens, a Fresnel lens or a cylindrical lens.

In at least one embodiment, the light transmittance of the body is greater than 0.7.

In at least one embodiment, the optical imaging film further comprises:

a reflecting structure provided on an outer surface of the focusing structure for reflecting the imaging of the multiple layers of graphic and text structure.

In at least one embodiment, the optical imaging film further comprises:

a protecting structure provided on an outer surface of the focusing structure for protecting the focusing structure from pollution of the external environment.

The embodiments of the present application also provide a method of preparing an optical imaging film, comprising:

respectively forming a focusing structure and a first graphic and text structure on a first side and a second side of an obtained first polymer which are opposite to each other;

providing an obtained second polymer on the first graphic and text structure, and forming a second graphic and text structure on an outer surface of the second polymer away from the focusing structure;

sequentially forming the rest N−2 layers of graphic and text structure which are stacked in accordance with the method of forming the second graphic and text structure, thereby obtaining the optical imaging film.

In at least one embodiment, the method comprises respectively forming the focusing structure and the first graphic and text structure on the opposite first and second sides of the obtained first polymer by any of the methods of embossing printing, intaglio printing or ink-jet printing;

forming the second graphic and text structure on a side of the obtained second polymer away from the focusing structure by any of the methods of embossing printing, intaglio printing or ink-jet printing;

forming the rest N−2 layers of the graphic text structure which are stacked in accordance with the method of forming the second graphic and text structure by any of the methods of embossing printing, intaglio printing or ink-jet printing.

In at least one embodiment, said respectively forming the focusing structure and the first graphic and text structure on the opposite first and second sides of the obtained first polymer includes:

squeezing the first side of the first polymer using a first mold, and squeezing the second side of the second polymer using a second mold, thereby forming a focusing preliminary structure and a first bearing preliminary structure which are integrally structured;

curing the polymers on which the focusing preliminary structure and the first bearing preliminary structure are formed, thereby forming the focusing structure and a first bearing structure;

when the first bearing structure is a recess, filling a first bearing material in the recess, or, when the first bearing structure is a protrusion, providing the first bearing on a top of the protrusion, so as to form the first graphic and text structure.

Seen from the above technical solutions provided by the embodiments of the present application, the embodiments of the present application provide the sequentially stacked N layers of graphic and text structure on the second surface of the body or inside the body, wherein each layer of graphic and text structure is located within an imaging range of the focusing structure, and each layer of graphic and text structure within the imaging range can form a suspension image by means of the focusing structure, and therefore the purpose of improving the sense of layering of the imaging of the imaging film can be realized.

BRIEF DESCRIPTION OF THE DRAWINGS

In order to explain more clearly the technical solutions in the embodiments of the present application or in the prior art, the following will briefly introduce the figures needed in the description of the embodiments or the prior art. Obviously, the figures in the following description are only some embodiments recorded in the present application, and for ordinary skilled persons in the art, other figures may also be obtained based on these figures without paying creative efforts.

DETAILED DESCRIPTION

To facilitate the understanding of the present invention, the following will make a more comprehensive description to the present invention with reference to the relevant accompanying drawings. The accompanying drawings provide preferred embodiments of the present invention. However, the present invention can be implemented in various different modes and is not limited to the embodiments described below. On the contrary, the purpose of providing these embodiments is to enable a more thorough and comprehensive understanding of the contents disclosed by the present invention.

It should be clearly stated that when an element is referred to as being "provided on" another element, it can be directly on the other element, or an intervening element may also exist. When an element is referred to as being "connected to" another element, it can be directly connected to the other element, or an intervening element may also exist at the same time. The terms "vertical", "horizontal", "left", "right" and similar expressions are used in this text for purpose of explanation only and do not represent the unique embodiment.

Unless otherwise defined, all technical and scientific terms used in this text have the same meaning as commonly understood by the skilled persons in the technical field to which the present invention belongs. The terms used in the Description of the present invention are for the purpose of describing the specific embodiments only, and are not intended to limit the present invention. The term "and/or" used in this text includes any and all combinations of one or more of the associated listed items.

The embodiments of the present application provide an optical imaging film, which comprises a body having a first surface and a second surface which are opposite to each other; a focusing structure is formed on the first surface of the body; and multiple layers of graphic and text structure are formed on the second surface of the body or inside the body. Each layer of graphic and text structure is located within an imaging range of the focusing structure, and each layer of graphic and text structure within the imaging range can form a suspension image by means of the focusing structure. Each layer of graphic and text structure contains a plurality of graphic and text units, and the projections of the graphic and text units in different layers of graphic and text structure on a horizontal plane do not overlap one another. This can ensure that each layer of graphic and text structure can be normally imaged, and the multiple layers of graphic and text structure can form different images which are layered. Thus, the purpose of improving the sense of layering of the imaging of the imaging film can be realized.

The following will make a detailed description to the micro optical imaging film provided by the embodiments of the present application in combination with the accompanying drawings.

Figure 1:
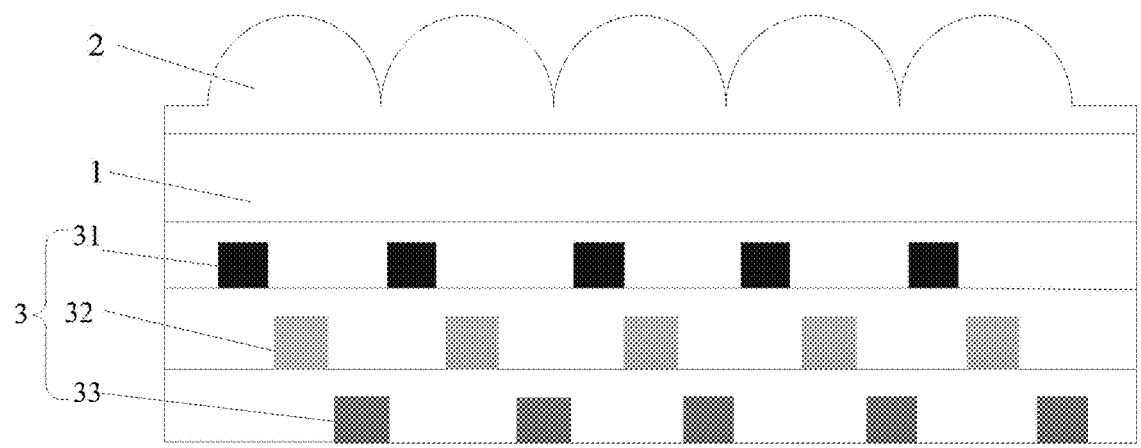
FIG. 1 is a structural schematic diagram of an optical imaging film provided by the embodiments of the present application.

The embodiments of the present application provide an optical imaging film as shown in FIG. 1. The optical imaging film comprises a body 1, a focusing structure 2 formed on a first surface of the body 1 and multiple layers of graphic and text structure 3 formed on a second surface of the body 1. The multiple layers of graphic and text structure 3 are imaged by means of the focusing structure 2. The multiple layers of graphic and text structure 3 can be N layers of graphic and text structure, wherein N is a positive integer greater than 1. FIG. 1 illustrates three layers of graphic and text structure, i.e., a first graphic and text structure 31, a second graphic and text structure 32 and a third graphic and text structure 33, but the multiple layers of graphic and text structure are not limited to the three layers of graphic and text structure. The first graphic and text structure 31 can be directly formed on the second surface of the body 1, the second graphic and text structure 32 is formed on an outer surface of the first graphic and text structure 31 away from the focusing structure 2, and the third graphic and text structure 33 is formed on an outer surface of the second graphic and text structure 32 away from the focusing structure 2.

The fabricating material of the body 1 can be a polymer. The polymer can be one kind of polymer, and can also be two kinds of polymers. Each kind of polymer can be an individual polymer, and can also be a mixed polymer formed by blending several individual polymers that do not react with one another. The polymer can be a resin material such as PET (polyethylene terephthalate), PVC (Polyvinyl chloride), PC (Polycarbonate) or PMMA (Polymethyl Methacrylate), and can also be a photocuring or thermocuring adhesive such as an UV (Ultraviolet Rays) adhesive and an OCA (Optically Clear Adhesive). The light transmittance of the body 1 can be greater than 70%, or the body 1 has a transparent color, or the body 1 is visually transparent.

Figure 2:
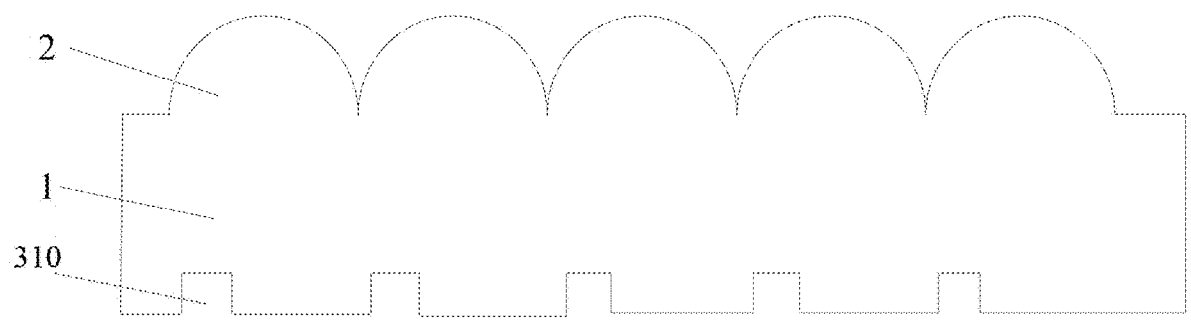
FIG. 2 is a structural schematic diagram of a first graphic and text structure in the optical imaging film provided by the embodiments of the present application.
Figure 3:
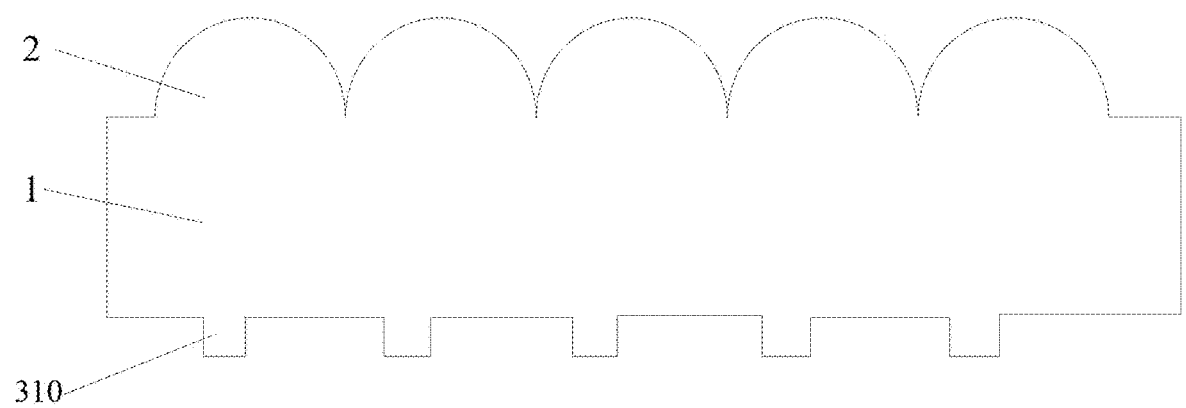
FIG. 3 is another structural schematic diagram of the first graphic and text structure in the optical imaging film provided by the embodiments of the present application.
Figure 4:
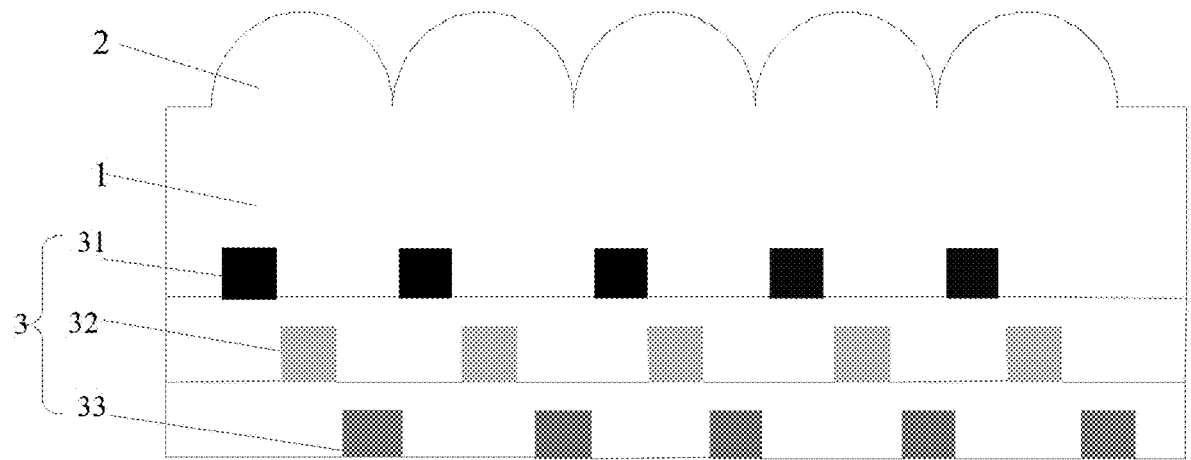
FIG. 4 is another structural schematic diagram of the optical imaging film provided by the embodiments of the present application.

When the polymer is one kind of polymer, the focusing structure 2 and the multiple layers of graphic and text structure 3 can be respectively formed on the opposite first and second surfaces of the body 1, and can also be respectively formed on the first surface of the body 1 and inside the body 1. At this point, the body 1 is a polymer layer, in which the polymer can be evenly distributed, and can also be unevenly distributed. The focusing structure 2 and a first bearing structure 310 (as shown in FIGS. 2-3) for forming the first graphic and text structure 31 are formed in the same polymer layer, thus no boundary face is present between the focusing structure 2 and the first bearing structure 310, and thereby the focusing structure 2 and the formed first graphic and text structure 31 can be integrally structured as shown in FIG. 4. In addition, when the fabricating material of a second bearing structure for forming the second graphic and text structure and a third bearing structure for forming the third graphic and text structure is also the same as the fabricating material of the first bearing structure, the three layers of bearing structure also do not have boundary faces therebetween, thus the integrity of the body, the focusing structure and the three layers of graphic and text structure can be regarded as an integral structure.

When the polymer is two kinds of polymers. The focusing structure 2 can be formed on the first surface of one kind of polymer, the first graphic and text structure 31 can be formed on the second surface of the other kind of polymer or inside the other kind of polymer, and the polymer used to fabricate the second graphic and text structure 32 and the third graphic and text structure 33 is the same as the polymer used to fabricate the first graphic and text structure 31. A difference value of refractive index between the two kinds of polymers is less than 0.5. A fused portion is formed at the adjacent parts of the two kinds of polymers. Therefore, the focusing structure 2 and the first graphic and text structure 31 can be regarded as an integral structure, no boundary face is present between the focusing structure 2 and the first bearing structure 310 for forming the first graphic and text structure 31, or, no obvious boundary line between layers is present between the focusing structure 2 and the first bearing structure 310 on a cross section of the imaging film, or the boundary line is a regular and ordered boundary line. The fused portion can be an area formed by fusing the two kinds of polymers according to a preset ratio. The preset ratio can be N:M, wherein N and M are respectively the amount of the two kinds of polymers at the junction of the adjacent parts of the focusing structure 2 and the first bearing structure, and the values of N and M can both be 0-100% but do not include 0 and 100%. What needs to be explained is that, the amount of said one kind of polymer in the focusing structure 2 is 100%, and said the other polymer in the first bearing structure is 100%. The adjacent parts can be the contact parts of the two kinds of polymers when the focusing structure 2 and the first bearing structure 310 are formed by squeezing the two kinds of polymers using a mold. The polymer that forms the second and third graphic and text structures is the same as the polymer that forms the first graphic and text structure. As such, the integrity of the body, the focusing structure and the three layers of graphic and text structure can be regarded as an integral structure.

The bearing structure for forming each layer of graphic and text structure can be in a recess shape (as shown in FIG. 2) or a protrusion shape (as shown in FIG. 3). What needs to be explained is that, for ease of illustration, FIGS. 2 to 3 only show the first bearing structure and do not show the second and third bearing structures. However, the three bearing structures can have the same shape, for example, the three can all be recesses; the three bearing structures can also have different shapes, for example, the first and second bearing structures are recesses, and the third bearing structure is a protrusion. In FIG. 4 and the subsequent figures, the boundary line shown between the three layers of graphic and text structure is only provided for ease of illustration, and there is no obvious boundary line between the three layers of graphic and text structure in a real product when the bearing structures of the three layers of graphic and text structure are formed by the same fabricating material. In addition, a difference value of refractive index between the fabricating material of the focusing structure 2 and the fabricating material of each layer of graphic and text structure can be less than 0.5, such that each layer of graphic and text structure can be normally imaged.

Figure 5:
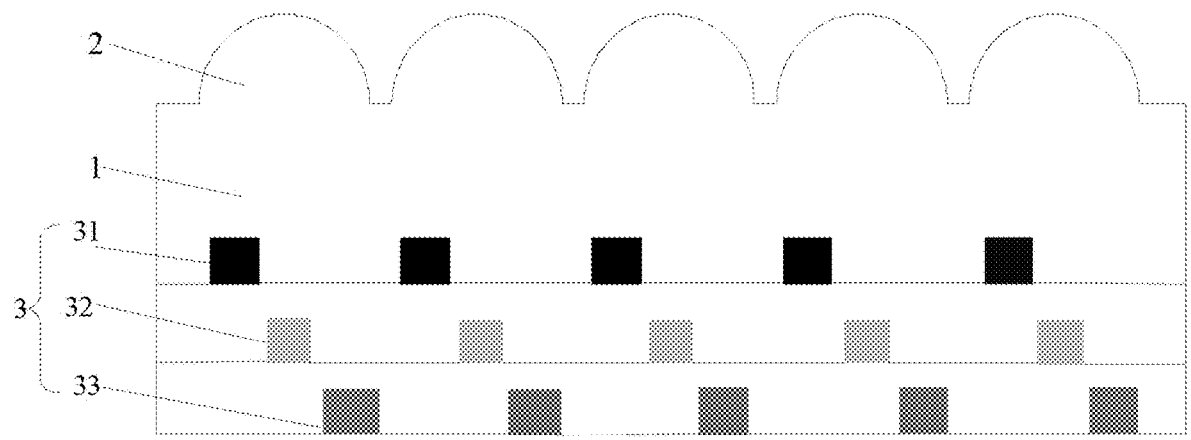
FIG. 5 is another structural schematic diagram of the optical imaging film provided by the embodiments of the present application.

The focusing structure 2 can be used for imaging the graphic and text structures, and can comprise one or more focusing units. The focusing unit can be a convex lens, a concave lens, a Fresnel lens or a cylindrical lens. There can be no gap between the focusing units (as shown in FIG. 1) in order to reduce the overall volume of the imaging film. There can also be gaps between the focusing units (as shown in FIG. 5) in order to ensure the completeness of the cut focusing units when cutting the imaging film, so that the subsequent imaging effect of the focusing units can be ensured. The focusing units can be a hexagonal array, a square array or a random array of another shape.

The focusing structure 2 can be formed on the first surface of the body 1, in particular, the focusing unit in the focusing structure 2 can be formed on the first surface of the body 1.

Each layer of graphic and text structure in the multiple layers of graphic and text structure 3 can include one or more identical or different graphic and text units. The graphic and text unit can be a pattern or a micro pattern (i.e., a pattern of micron level), for example, it can be a pattern with an easily recognizable shape, such as a graph, a character, a number, a grid, a landscape painting and/or a logo. The different graphic and text units can be different in sizes of the (micro) patterns, can also be different in shapes of the (micro) patterns, and can further be different in constructions of the (micro) patterns, for example, the first (micro) pattern is a company name, and the second (micro) pattern is a company Logo. The multiple layers of graphic and text structure 3 are imaged by the focusing structure 2, which can be understood as that the graphic and text units are imaged by the corresponding focusing units. The graphic and text units in the same graphic and text structure can have the same color, and can also have different colors; The graphic and text units in different graphic and text structures can have the same color, and can also have different colors.

Figure 6:
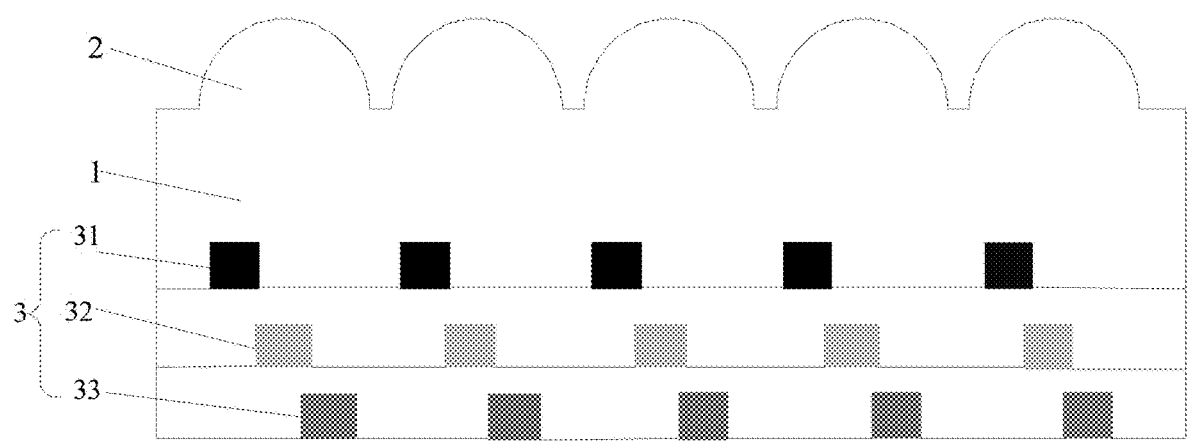
FIG. 6 is another structural schematic diagram of the optical imaging film provided by the embodiments of the present application.

The projections of the graphic and text units in different graphic and text structures on a horizontal plane do not overlap one another, which can be understood as that the graphic and text units in the $(N-1)^{th}$ layer of graphic and text structure do not completely cover the corresponding graphic and text units in the $N^{th}$ layer of graphic and text structure, and the projections of the corresponding graphic and text units in different graphic and text structures on a same horizontal plane are at least partially staggered with respect to one another. The fact that the projections of the graphic and text units in different graphic and text structures on a horizontal plane do not overlap one another can include that a horizontal position of each graphic and text unit in each layer of graphic and text structure corresponds to a spacing between two corresponding graphic and text units in adjacent layers of graphic and text structure, as shown in FIG. 1. The fact that the projections of the graphic and text units in different graphic and text structures on a horizontal plane do not overlap each other can also include that a horizontal position of each graphic and text unit in each layer of graphic and text structure partially overlaps a horizontal position of the corresponding graphic and text unit in the adjacent graphic and text structure, as shown in FIG. 6.

Figure 7:
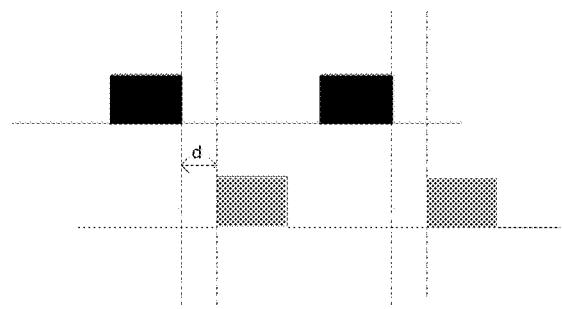
FIG. 7 is a schematic diagram of a horizontal position deviation between an actual position of a graphic and text unit in a certain layer of graphic and text structure and a corresponding preset position in an embodiment.

In one embodiment, a horizontal position deviation Δ between an actual position of each graphic and text unit in each layer of graphic and text structure and the corresponding preset position thereof can be smaller than 10 microns, as shown in FIG. 7. In FIG. 7, the position corresponding to the dotted line a is the preset position of the $m^{th}$ graphic and text unit in a certain layer of graphic and text structure, and the position corresponding to the dotted line b is the actual position of the $m^{th}$ graphic and text unit in this layer of graphic and text structure, wherein m is a positive integer. The preset position can be a position that is set in advance for each layer of graphic and text structure.

When the first bearing structure is a (micro) recess, the first graphic and text structure 31 can be formed by forming one or more of the (micro) recesses on the second surface of the body using a mold and then filling a first bearing material in the (micro) recesses. The first bearing material can be a material which is different from the fabricating material of the body in the refractive index of light, including a staining material, a dyeing material, a metal material or a conductive material, such as a color ink like oily ink or nano ink. What needs to be explained is that the color of the first bearing material can be different from that of the body, so that people can apparently distinguish the pattern in the graphic and text structure when observing the imaging of the graphic and text structure.

When the first bearing structure is a (micro) protrusion, the first graphic and text structure 31 can also be formed by forming one or more of the (micro) protrusions on the second surface of the body using a mold and then providing the first bearing material on a top of the (micro) protrusions. The first graphic and text structure 31 can also be formed by performing intaglio printing or ink-jet printing on the body.

The second graphic and text structure 32 can be formed in the following way: after the first graphic and text structure 31 is formed on the second surface of the body 1, a layer of polymer (such as UV adhesive) is coated on the outer surface of the first graphic and text structure 31; then one or more (micro) recesses are formed on the coated polymer using a mold; and at last a second bearing material is filled in the formed (micro) recesses thereby forming the second graphic and text structure. The second graphic and text structure 32 can also be formed by forming one or more (micro) protrusions on the coated polymer using a mold and then setting the second bearing material on a top of the (micro) protrusions. The second graphic and text structure 32 can also be formed by performing intaglio printing or ink-jet printing on the first graphic and text structure 31.

The second bearing material can also be a material such as a staining material, a dyeing material, a metal material or a conductive material, but the color thereof can be different from that of the first bearing material. The micro recess or protrusion can refer to a recess or protrusion of micron level.

The third graphic and text structure 33 is formed in a similar way as the second graphic and text structure 32, thus no redundant description thereof will be provided anymore. If necessary, more layers of graphic and text structure can be formed in accordance with the above method of forming the second graphic and text structure. For more than two layers of graphic and text structure, from the third layer of graphic and text structure, each layer of graphic and text structure can be formed by providing a recess or a protrusion on the corresponding side of the already formed graphic and text structures. For example, a recess or a protrusion is formed on a side of a $(j+1)^{th}$ layer of graphic and text structure away from a $j^{th}$ layer of graphic and text structure to form a $(j+2)^{th}$ layer of graphic and text structure, wherein j is a positive integer from 1 to N−2.

What needs to be explained is that, the graphic and text structures here are not limited to the recess portions in which the bearing materials are filled, but also include the portions around the recesses.

Figure 8:
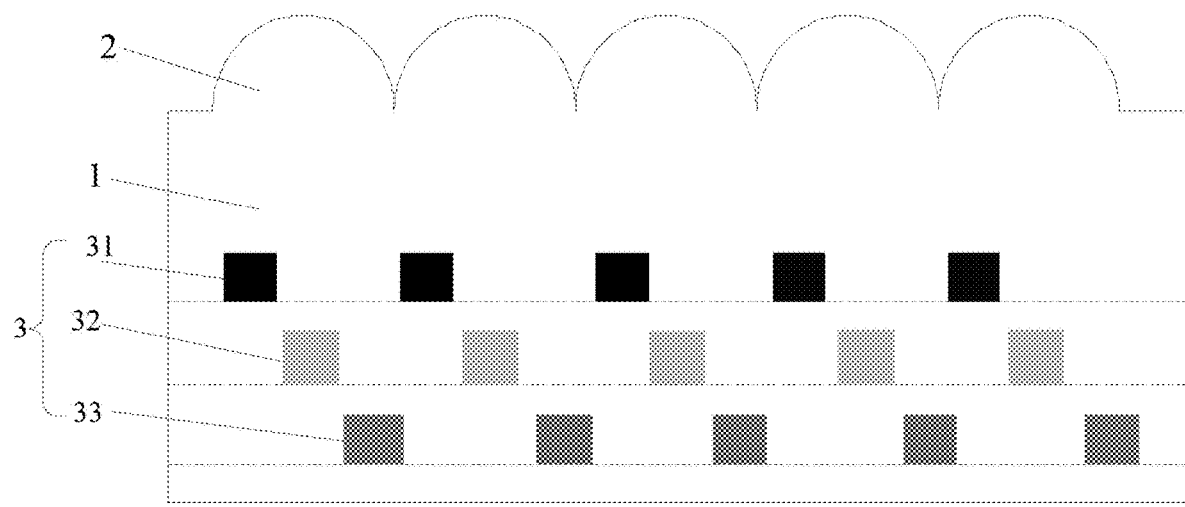
FIG. 8 is a structural schematic diagram of another optical imaging film provided by the embodiments of the present application.

In addition, the multiple layers of graphic and text structure 3 can not only be formed on the second surface of the body 1 away from the focusing structure 2, but can also be formed inside the body 1, as shown in FIG. 8. As for the structure shown in FIG. 8, the first graphic and text structure can be formed by forming a recess on a surface of a polymer and then filling the recess with the first bearing material, and the second graphic and text structure is formed by coating the surface of the formed first graphic and text structure with the polymer, forming a recess on a surface of the polymer away from the first graphic and text structure, and then filling the recess with the second bearing material. In the same manner, the other layers of graphic and text structure are formed, and the same polymer is coated on the last layer of graphic and text structure and cured. The multiple layers of graphic and text structure formed in this way are located inside the body. Since the two sides of each layer of graphic and text structure include the same polymer, the surfaces on which the multiple layers of graphic and text structure are located will disappear due to polymer fusion, no boundary surface will be formed inside the body, and thus the focusing structure and the multiple layers of graphic and text structure can still be regarded as an integral structure.

The multiple layers of graphic and text structure can be adapted to the focusing structure, which can be understood as that the multiple layers of graphic and text structure can be imaged by means of the focusing structure. The fact that the multiple layers of graphic and text structure can be adapted to the focusing structure can include that the positions of the multiple layers of graphic and text structure and the focusing structure match with each other. For example, a distance from each of the multiple layers of graphic and text structure to the focusing structure is from 0.7 to 1.3 times of a focal length of the focusing unit in the focusing structure. For example, the focal length of the focusing unit is 150 μm, then the distance from the first graphic and text structure to the focusing structure can be 110 μm, the distance from the second graphic and text structure to the focusing structure can be 150 μm, and the third graphic and text structure to the focusing structure can be 190 μm. The multiple layers of graphic and text structure being adapted to the focusing structure 2 can also include that the focusing unit in the focusing structure 2 is provided in correspondence with the graphic and text unit of each of the multiple layers of graphic and text structure, which, when cutting the imaging film, is beneficial to ensuring each cut imaging film unit at least includes one complete focusing unit and graphic and text unit.

The multiple layers of graphic and text structure can be located on or adjacent to a focal plane of the focusing structure, and can be imaged by the focusing structure. The suspension images of the multiple layers of graphic and text structure can be observed on a side of the focusing structure opposite to the multiple layers of graphic and text structure. A height of the formed suspension image and a distance from each layer of graphic and text structure to the focusing structure satisfy the following relational expression:

$$d_i = \frac{f_i - R}{1 - \frac{x_i}{x_{MLA}}} + R,$$

wherein, $d_i$ is the height of the suspension image; $f_i$ is the distance from the $i^{th}$ layer of graphic and text structure to the focusing structure, which can be the focal length of the focusing structure; R is a radius of curvature of the focusing structure; $x_i$ is a horizontal coordinate of the $i^{th}$ layer of graphic and text structure; $x_{MLA}$ is a horizontal coordinate of the focusing structure, and a value of i is ranged from 1 to N. When $$\frac{x_{MPA}}{x_{MLA}} > 1,$$

an enlarged suspension image will be obtained.

In a specific embodiment, $f_i$ is a focal length of the focusing unit in the focusing structure; R is a radius of curvature of the focusing unit in the focusing structure; $x_i$ is a horizontal coordinate of the graphic and text unit corresponding to the focusing unit in the $i^{th}$ layer of graphic and text structure, and $x_{MLA}$ is a horizontal coordinate of the focusing unit in the focusing structure.

Figure 9:
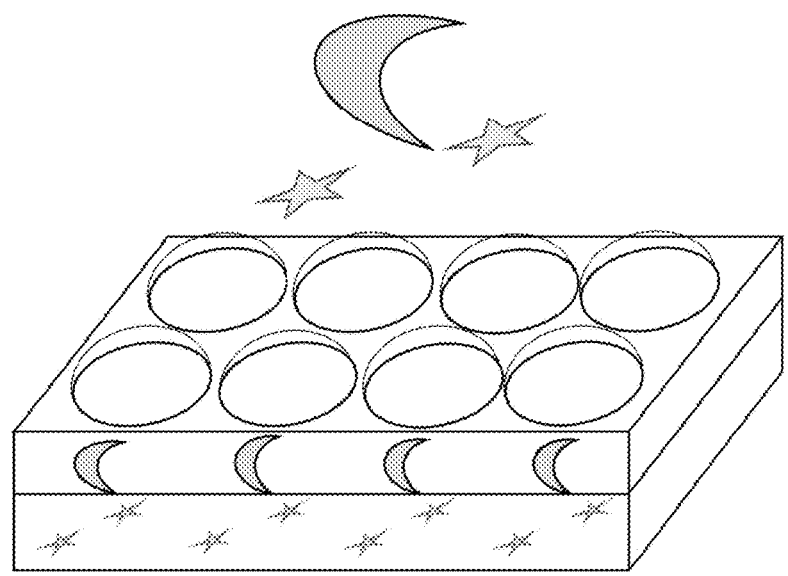
FIG. 9 is an imaging schematic diagram of multiple layers of graphic and text structure in the optical imaging film provided by the embodiments of the present application.

FIG. 9 illustrates the enlarged suspension images formed from the multiple layers of graphic and text structure through the focusing structure in actual applications.

A distance from the top of the focusing structure to the top of the layer of graphic and text structure in the multiple layers of graphic and text structure which is closest to the focusing structure can be 2 to 150 microns. When the distance between the focusing structure and the multiple layers of graphic and text structure is very small, it can be understood that the multiple layers of graphic and text structure is embedded in the focusing structure. The smaller the distance between the focusing structure and the multiple layers of graphic and text structure is, the thinner the imaging film is, which not only can save costs but also enables easy cutting during hot stamping.

It can be seen from the above description that the embodiments of the present application provide the multiple layers of graphic and text structure on the body of the imaging film, wherein the projections of the graphic and text units in different layers of graphic and text structure on a horizontal plane do not overlap one another. This can ensure that each layer of graphic and text structure can be normally imaged, and the multiple layers of graphic and text structure can form different images which are layered, thereby not only the purpose of improving the sense of layering of the imaging of the imaging film can be realized, suspension imaging can also be realized, and the anti-counterfeiting effect can also be improved. In addition, the colors of the graphic and text units in different layers of graphic and text structure are different, which can enable the imaging film to have more diversified colors, thereby making the product applying the imaging film more beautiful and plentiful, which contributes to improving the user experience. In addition, the focusing structure and the first graphic and text structure in the embodiments of the present application can be an integral structure without a base material layer, which can reduce the thickness of the imaging film. Besides, the mechanical property of the imaging film is very poor, thus the imaging film is easy to be cut when being hot stamped.

Figure 10:
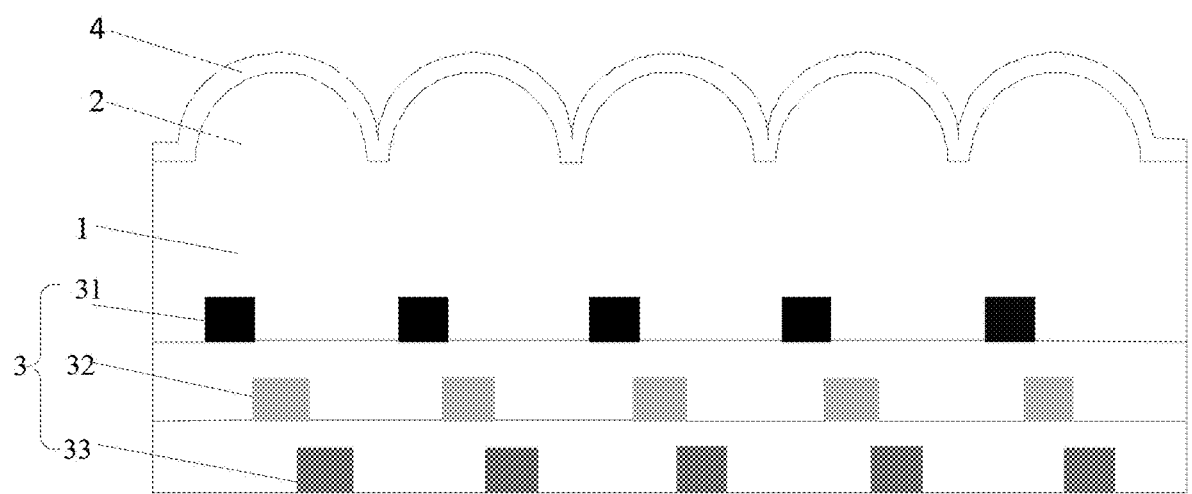
FIG. 10 is another structural schematic diagram of the optical imaging film provided by the embodiments of the present application.

In another embodiment, the imaging film can also include a reflecting structure 4, as shown in FIG. 10. The reflecting structure 4 can be provided on the outer surface of the focusing structure 2 away from the multiple layers of graphic and text structure 3. The reflecting structure 4 can be used to reflecting the imaging of the multiple layers of graphic and text structure 3, so that the imaging of the multiple layers of graphic and text structure 3 can be observed on the side where the multiple layers of graphic and text structure 3 are located, which is beneficial to improving the user experience effect.

Figure 11:
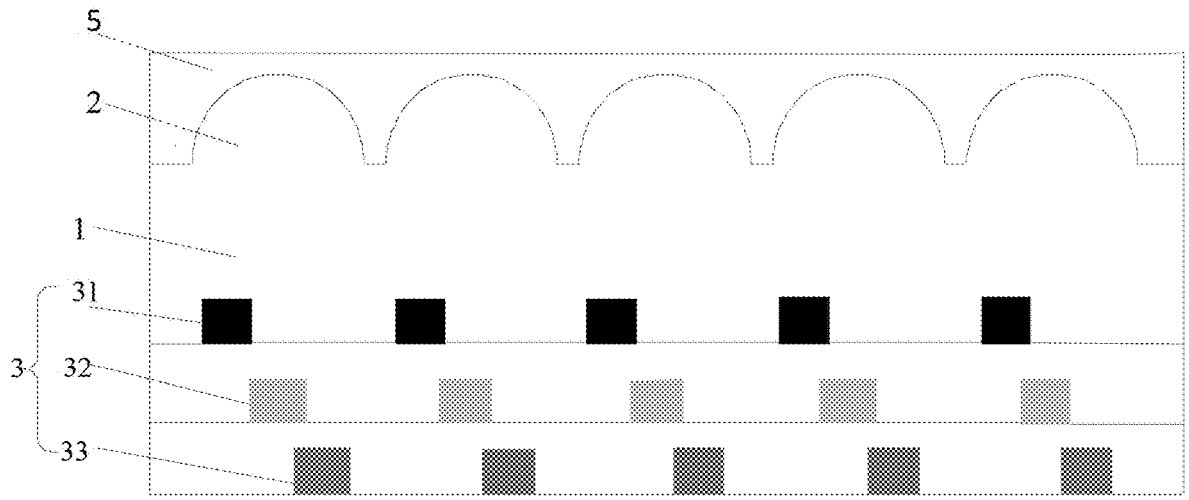
FIG. 11 is another structural schematic diagram of the optical imaging film provided by the embodiments of the present application.

In another embodiment, the imaging film can also include a protecting structure 5, as shown in FIG. 11. The protecting structure 5 can be provided on the outer surface of the focusing structure 2, and can partially or completely cover the focusing structure. The light transmittance of the protecting structure 5 can be greater than 70% The protecting structure 5 can be used to protect the focusing structure 2 from pollution of the external environment, which is beneficial to improving the service life of the imaging film.

Figure 12:
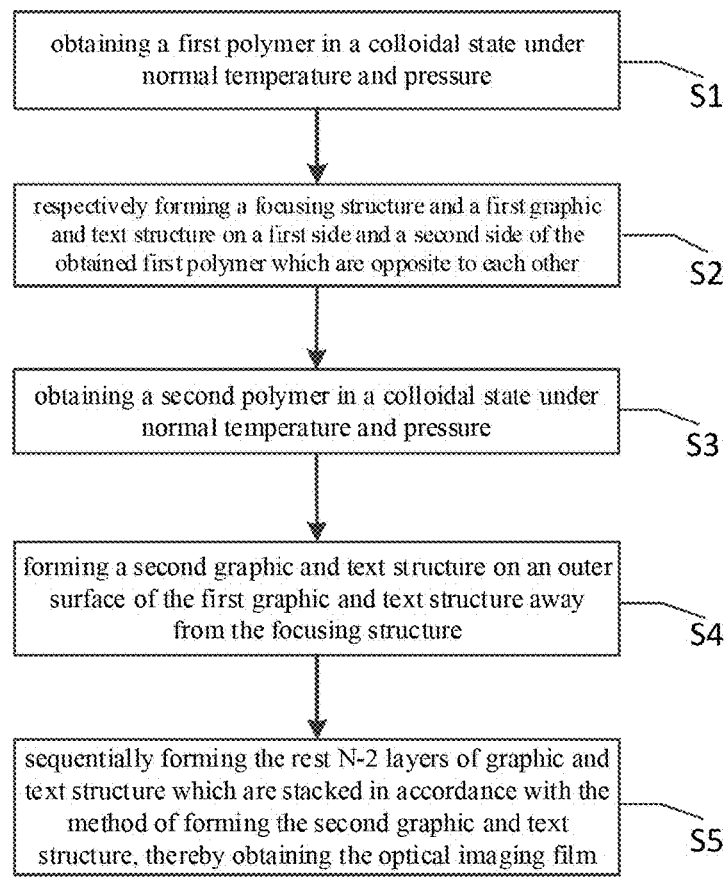
FIG. 12 is a flow chart of the preparation method of an optical imaging film provided by the embodiments of the present application.

The embodiments of the present application also provide a method of preparing the above described optical imaging film, as shown in FIG. 12. The method comprises the following steps.

S1: obtaining a first polymer in a colloidal state under normal temperature and pressure.

The first polymer can be one kind of polymer, and can also be two kinds of polymers. Each kind of polymer can be an individual polymer such as a curable resin or an UV adhesive, and can also be a mixed polymer formed by blending multiple polymers which do not react with one another.

The first polymer can be obtained by using the method in the prior art, and no redundant description thereof will be provided anymore.

S2: respectively forming a focusing structure and a first graphic and text structure on a first side and a second side of the obtained first polymer which are opposite to each other.

After the first polymer is obtained, the focusing structure and the first graphic and text structure can be respectively formed on the opposite first and second sides of the obtained first polymer. To be specific, in one embodiment, the step can include the following substeps.

S2A: squeezing the first side of the first polymer by using a first mold of a micro lens type to form a focusing preliminary structure, and squeezing the second side of the polymer by using a second mold of a first preset protrusion type to form a first bearing preliminary structure.

The focusing preliminary structure and the first bearing preliminary structure form an integral structure in the squeezing process. The focusing preliminary structure can be a micro lens array containing one or more micro lenses. The first bearing preliminary structure can include one or more micro recesses.

S2B: curing the first polymer on which the focusing preliminary structure and the first bearing preliminary structure are formed, so as to form a focusing structure, a first bearing structure and a body.

After the focusing preliminary structure and the first bearing preliminary structure are formed, the focusing preliminary structure and the first bearing preliminary structure can be cured to respectively form the focusing structure and the first bearing structure.

The curing of the focusing preliminary structure and the first bearing preliminary structure can be realized by directly performing thermocuring or photocuring to the focusing preliminary structure and the first bearing preliminary structure; or the curing of the focusing preliminary structure and the first bearing preliminary structure can be realized by applying an irradiation source or a heat source to the first mold and/or the second mold. For example, if the polymer is an UV adhesive, the focusing preliminary structure and the first bearing preliminary structure are cured by irradiation with ultraviolet lights so as to form the focusing structure and the first bearing structure.

S2C: filling a first bearing material into the first bearing structure to form a first graphic and text structure, wherein a refractive index of the first bearing material is different from that of the polymer.

After the first bearing structure is obtained, the first bearing structure can be filled with the first bearing material, and a curing measure such as drying or sintering can be performed to the first bearing material, so as to form the first graphic and text structure. For ease of observation, the first bearing material can have a different refractive index from the polymer, and its color can also be different from that of the polymer.

In another embodiment, the step can include the following substeps.

S2A': squeezing the first side of the polymer by using a first mold of a micro lens type to form a focusing preliminary structure, and squeezing the second side of the polymer by using a third mold of a first preset recess type to form a first bearing preliminary structure.

The focusing preliminary structure and the first bearing preliminary structure form an integral structure in the squeezing process. The focusing preliminary structure can be a micro lens array containing one or more micro lenses. The first bearing preliminary structure can include one or more micro protrusions.

S2B': curing the first polymer on which the focusing preliminary structure and the first bearing preliminary structure are formed, so as to form a focusing structure, a first bearing structure and a body.

After the focusing preliminary structure and the first bearing preliminary structure are formed, the focusing preliminary structure and the first bearing preliminary structure can be cured to respectively form the focusing structure and the first bearing structure.

The curing of the focusing preliminary structure and the first bearing preliminary structure can be realized by directly performing thermocuring or photocuring to the focusing preliminary structure and the first bearing preliminary structure; or the curing of the focusing preliminary structure and the first bearing preliminary structure can be realized by applying an irradiation source or a heat source to the first mold and/or the third mold. For example, if the polymer is an UV adhesive, the focusing preliminary structure and the first protruding bearing preliminary structure are cured by irradiation with ultraviolet lights so as to form the focusing structure and the first bearing structure.

S2C': jet printing the first bearing material on a top of the first bearing structure to form the first graphic and text structure.

After the first bearing structure is obtained, the first bearing material, such as ink, can be jet printed onto an outer surface of the top of the first bearing structure, and a curing measure, such as drying or sintering, can be performed to the jet printed ink, so as to form the first graphic and text structure. For ease of observation, the jet printed ink can have a different refractive index from the polymer, and the color thereof can also be different from that of the polymer.

S3: obtaining a second polymer in a colloidal state under normal temperature and pressure.

The second polymer can be the same as the first polymer, and can also be different therefrom.

S4: forming a second graphic and text structure on an outer surface of the first graphic and text structure away from the focusing structure;

In one embodiment, after the first graphic and text structure is obtained, a layer of the second polymer (such as UV adhesive) is coated on the outer surface of the first graphic and text structure; then a fourth mold of a second preset protrusion type can be employed to perform embossing printing to a side of the polymer away from the first graphic and text structure to form a second bearing preliminary structure; thereafter, the second bearing preliminary structure is cured; and at last a second bearing material is filled into the second bearing structure to form the second graphic and text structure. The color of the second bearing material can be different from that of the first bearing material.

In another embodiment, after the first graphic and text structure is obtained, a layer of the second polymer (such as UV adhesive) is coated on the outer surface of the first graphic and text structure; then a fifth mold of a second recess type can be employed to perform embossing printing to a side of the polymer away from the first graphic and text structure to form a second bearing preliminary structure; thereafter, the second bearing preliminary structure is cured to form a second bearing structure; and at last an outer surface of the formed second bearing structure is jet printed with ink, and a curing measure, such as drying or sintering, is performed to the jet printed ink to form the second graphic and text structure.

Reference can be made to the relevant description of the formation of the first graphic and text structure for the specific procedure of forming the second graphic and text structure, and no redundant description thereof will be provided anymore.

S5: sequentially forming the rest N−2 layers of graphic and text structure which are stacked in accordance with the method of forming the second graphic and text structure, thereby obtaining the optical imaging film.

After the second graphic and text structure is obtained, a third graphic and text structure can be formed on the outer surface of the second graphic and text structure in accordance with the way of forming the second graphic and text structure on the outer surface of the first graphic and text structure, and a fourth graphic and text structure can be formed on the outer surface of the third graphic and text structure. In this manner, the preparation of the optical imaging film is finished until the $N^{th}$ layer of graphic and text structure is formed on the outer surface of the $(N-1)^{th}$ layer of graphic and text structure.

In the above steps, the molds can all be metal molds made of nickel, aluminum, or stainless steel, and can also be non-metal molds made of PC or PET.

In addition, the focusing structure and the first graphic and text structure can also be respectively formed on the opposite first and second sides of the obtained first polymer by intaglio printing or ink-jet printing. The way of forming the rest $(N-1)^{th}$ layers of graphic and text structure can also be selected from intaglio printing and ink-jet printing. In other words, the molding methods of the focusing structure and each layer of graphic and text structure can be respectively selected from any one of the above mentioned methods of embossing printing, intaglio printing or ink-jet printing. In other words, the focusing structure and each layer of graphic and text structure can be formed by using the same molding method, and can also be formed by different molding methods respectively. Preferably, the focusing structure and each layer of graphic and text structure assume the same molding method. Reference can be made to the relevant description in the prior art for the specific forming process, and no redundant description thereof will be provided anymore. When applying intaglio printing or ink-jet printing, the colors of the layers of graphic and text structure can also be diversified, so that the whole suspension image will present a stereoscopic, multi-layered and colorful visual effect, thus having a good decorative effect and/or a very high anti-counterfeiting effect.

From the above steps, it can be seen that the optical imaging film prepared in the embodiments of the present application has multiple layers of graphic and text structure, which not only can realize the purpose of improving the anti-counterfeiting effect but also can enable the prepared imaging film to have a better sense of layering. Moreover, since the colors of the bearing materials are different, the colors of different layers of graphic and text structure are different, which can make the imaging film has more diversified colors, thereby making the products applying the imaging film more beautiful and plentiful. In addition, the prepared focusing structure and the first graphic and text structure in the embodiments of the present application can be an integral structure without a base material layer, which can reduce the thickness of the imaging film.

What needs to explained is that, the focusing structure and the multiple layers of graphic and text structure in the embodiments of the present application being formed as an integral structure can refer to that the focusing structure and the multiple layers of graphic and text structure will not involve a boundary face; or, no obvious boundary line between layers is present between the focusing structure and the multiple layers of graphic and text structure on the cross section of the imaging film, or the boundary line is a regular and ordered boundary line.

Any numerical value cited in the present application includes all values including the lower and the upper values, in increments of one unit, between the lower limiting value to the upper limiting value, provided that there is a separation of at least two units between any lower value and any higher value. For example, if it is elaborated that the value of the number of a component or of a process variable (such as temperature, pressure, time, etc.) is from 1 to 90, preferably from 20-80, and more preferably from 30-70, then the purpose is to illustrate that the description also explicitly lists the values such as from 15-85, from 22 to 68, from 43 to 51 and from 30-32. As for values smaller than 1, it shall be appreciated appropriately that one unit is 0.0001, 0.001, 0.01 or 0.1. These are only examples for explicit expression, and it can be regarded that all possible combinations of values listed between the minimum value and the maximum value have been explicitly elaborated in a similar way in the description.

Unless otherwise stated, all ranges include the endpoints and all numbers that fall between the endpoints. The use of "about" or "approximately" together with a range applies to both ends of the range. Therefore, the expression "about 20 to 30" is intended to cover "about 20 to about 30", and at least includes the expressly pointed out endpoints.

The disclosures of all articles and references, including patent applications and publications, are incorporated therein by reference for all purposes. The term "substantially consists of . . . " which describes a combination should include the determined elements, components, parts or steps, as well as other elements, components, parts or steps that in substance do not affect the basic novel features of the combination. The use of terms "contain" or "comprise" to describe the combination of the elements, components, parts or steps therein also take into account the embodiment substantially constructed by these elements, components, parts or steps. Here, by using the term "can", it is intended to explain that any described attribute that "can" be included is selectable.

Multiple elements, components, parts or steps can be provided by a single integral element, component, part or step. Alternatively, a single integral element, component, part or step can be divided into a plurality of separated elements, components, parts or steps. The terms "a" or "one" used to describe the elements, components, parts or steps are not intended to exclude other elements, components, parts or steps.

Each embodiment in this specification is described progressively, reference can be made to each other for the identical and similar parts between the embodiments, the illustration focus of each embodiment is the place which is different from the other embodiments.

In order to make the above purposes, features and advantages of the present invention more obvious and easier to be understood, a detailed description of the specific embodiments of the present invention has been made in the above in combination the accompanying drawings. In the above description, a lot of specific details are elaborated for fully understanding of the present invention. However, the present invention can be implemented in many other ways different from that mentioned above, thus a person skilled in the art can make similar improvements without violating the connotation of the present invention. Therefore, the present invention is not limited by the above disclosed specific embodiment. Besides, the technical features of the above embodiments can be combined randomly. For simplicity of the description, not all possible combinations of the technical features of the above embodiments are described. However, as long as the combinations of these technical features are not contradictory, they should be regarded as within the range recorded in the specification.

The above embodiments only present several embodiments of the present invention, which are specifically and detailed described, but cannot be understood as limitations to the patent scope of the present invention. What should be pointed out is that, for ordinary skilled persons in this field, on the premise of not deviating from the conception of the present invention, some deformations and improvements can be made, which belong to the protection scope of the present invention. Therefore, the protection scope of the present patent for invention should be subject to the attached claims.

The invention claimed is:

1. An optical imaging film, comprising:
a body having a first surface and a second surface which are opposite to each other;
a focusing structure provided on the first surface of the body;
N layers of graphic and text structure which are stacked in sequence on the second surface of the body or inside the body, N being a positive integer greater than 1, wherein,
each layer of graphic and text structure is located within an imaging range of the focusing structure, and each layer of graphic and text structure in the imaging range can form a suspension image by means of the focusing structure; wherein, a height of the suspension image formed by each layer of graphic and text structure and a distance from each layer of graphic and text structure to the focusing structure satisfy the following relational expression:

$$d_i = \frac{f_i - R}{1 - \frac{x_i}{x_{MLA}}} + R,$$

wherein, $d_i$ is the height of the suspension image; $f_i$ is the distance from the $i^{th}$ layer of graphic and text structure to the focusing structure; R is a radius of curvature of the focusing structure; $x_i$ is a horizontal coordinate of the $i^{th}$ layer of graphic and text structure; $x_{MLA}$ is a horizontal coordinate of the focusing structure, and a value of i is ranged from 1 to N.

2. The optical imaging film according to claim 1, wherein, the body, the focusing structure and the N layers of graphic and text structure are an integral structure.

3. The optical imaging film according to claim 2, wherein, a polymer used to fabricate the focusing structure and the N layers of graphic and text structure and a polymer used to fabricate the body are a same polymer; or, a fused portion is formed between a polymer used to fabricate the focusing structure and another polymer used to fabricate a first layer of graphic and text structure in the N layers of graphic and text structure, and a polymer used to fabricate the rest N layers of graphic and text structure is the same as the polymer used to fabricate the first layer of graphic and text structure.

4. The optical imaging film according to claim 1, wherein, a difference value of refractive index between a fabricating material of the focusing structure and a fabricating material of each layer of graphic and text structure is less than 0.5.

5. The optical imaging film according to claim 1, wherein, a distance from each layer of graphic and text structure to a focal plane of the focusing structure is from 0.7 to 1.3 times of a focal length of the focusing structure.

6. The optical imaging film according to claim 1, wherein, each layer of graphic and text structure contains a plurality of graphic and text units, and the projections of the graphic and text units in different layers of graphic and text structure on a horizontal plane do not overlap one another.

7. The optical imaging film according to claim 6, wherein, a horizontal position of each graphic and text unit in each layer of graphic and text structure corresponds to a spacing between two corresponding graphic and text units in adjacent layers of graphic and text structure.

8. The optical imaging film according to claim 1, wherein, each layer of graphic and text structure contains a plurality of graphic and text units, the graphic and text units in a same layer of graphic and text structure have the same color, and the graphic and text units in different layers of graphic and text structure have different colors.

9. The optical imaging film according to claim 1, wherein, when N is equal to 2, a recess or protrusion is provided on the second surface of the body to form a first layer of graphic and text structure, and a recess or protrusion is formed on a side of the first layer of graphic and text structure away from the focusing structure to form a second layer of graphic and text structure;

when N is greater than 2, a recess or protrusion is provided on the second surface of the body to form a first layer of graphic and text structure, a recess or protrusion is formed on a side of the first layer of graphic and text structure away from the focusing structure to form a second layer of graphic and text structure, and a recess or protrusion is formed on a side of a $(j+1)^{th}$ layer of graphic and text structure away from a $j^{th}$ layer of graphic and text structure to form a $(j+2)^{th}$ layer of graphic and text structure, wherein j is a positive integer between 1 and N−2.

10. The optical imaging film according to claim 1, wherein, the focusing structure comprises a convex lens, a concave lens, a Fresnel lens or a cylindrical lens.

11. The optical imaging film according to claim 1, wherein, the light transmittance of the body is greater than 0.7.

12. The optical imaging film according to claim 1, wherein, the optical imaging film further comprises:
a reflecting structure provided on an outer surface of the focusing structure for reflecting imaging of the Multi-layers of graphic and text structure.

13. The optical imaging film according to claim 1, wherein, the optical imaging film further comprises:
a protecting structure provided on an outer surface of the focusing structure for protecting the focusing structure from pollution of the external environment.

14. A method of preparing an optical imaging film, comprising:
respectively forming a focusing structure and a first graphic and text structure on a first side and a second side of an obtained first polymer which are opposite to each other;
providing an obtained second polymer on the first graphic and text structure, and forming a second graphic and text structure on the second polymer;
sequentially forming the rest N−2 layers of graphic and text structure which are stacked in accordance with the method of forming the second graphic and text structure, thereby obtaining the optical imaging film; wherein, a height of the suspension image formed by each layer of graphic and text structure and a distance from each layer of graphic and text structure to the focusing structure satisfy the following relational expression:

$$d_i = \frac{f_i - R}{1 - \frac{x_i}{x_{MLA}}} + R,$$

wherein, $d_i$ is the height of the suspension image; $f_i$ is the distance from the $i^{th}$ layer of graphic and text structure to the focusing structure; R is a radius of curvature of the focusing structure; $x_i$ is a horizontal coordinate of the $i^{th}$ layer of graphic and text structure; $x_{MLA}$ is a horizontal coordinate of the focusing structure, and a value of i is ranged from 1 to N.

15. The method according to claim 14, characterized in forming the focusing structure and the first graphic and text structure on the first side and the second side of the obtained first polymer which are opposite to each other by any of the methods of embossing printing, intaglio printing or ink-jet printing;
forming the second graphic and text structure on a side of the obtained second polymer away from the focusing structure by any of the methods of embossing printing, intaglio printing or ink-jet printing;
forming the rest N−2 layers of the graphic text structure which are stacked in accordance with the method of forming the second graphic and text structure by any of the methods of embossing printing, intaglio printing or ink-jet printing.

16. The method according to claim 15, wherein, said respectively forming the focusing structure and the first graphic and text structure on the first side and the second side of the obtained first polymer which are opposite to each other includes:
squeezing the first side of the first polymer using a first mold, and squeezing the second side of the second polymer using a second mold, thereby forming a focusing preliminary structure and a first bearing preliminary structure which are integrally structured;
curing the polymers on which the focusing preliminary structure and the first bearing preliminary structure are formed, and forming a focusing structure and a first bearing structure;
when the first bearing structure is a recess, filling a first bearing material in the recess, or, when the first bearing structure is a protrusion, providing the first bearing material on a top of the protrusion to form the first graphic and text structure.

* * * * *